US008374151B2

(12) United States Patent
Ke

(10) Patent No.: US 8,374,151 B2
(45) Date of Patent: Feb. 12, 2013

(54) METHOD AND SYSTEM FOR ACQUIRING CONTINUOUS PACKET CONNECTIVITY TECHNOLOGY SUPPORT CAPABILITY INFORMATION

(75) Inventor: Yazhu Ke, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 229 days.

(21) Appl. No.: 12/446,574

(22) PCT Filed: Aug. 23, 2007

(86) PCT No.: PCT/CN2007/002556
§ 371 (c)(1),
(2), (4) Date: Apr. 21, 2009

(87) PCT Pub. No.: WO2008/049308
PCT Pub. Date: May 2, 2008

(65) Prior Publication Data
US 2010/0135188 A1    Jun. 3, 2010

(30) Foreign Application Priority Data
Oct. 26, 2006  (CN) .......................... 2006 1 0137726

(51) Int. Cl.
*H04W 4/00*  (2009.01)
*H04W 36/00* (2009.01)
(52) U.S. Cl. ......... 370/331; 370/350; 455/438; 455/442
(58) Field of Classification Search .................. 370/335, 370/455, 331; 455/127.1, 127.5, 522, 435.1, 455/438, 441–445
See application file for complete search history.

(56) References Cited

U.S. PATENT DOCUMENTS

| 2007/0133479 | A1* | 6/2007 | Montojo et al. | 370/335 |
| 2007/0259682 | A1* | 11/2007 | Kaikkonen et al. | 455/522 |
| 2007/0293162 | A1* | 12/2007 | Jaatinen et al. | 455/84 |
| 2008/0049683 | A1* | 2/2008 | Nakamata et al. | 370/335 |
| 2008/0049710 | A1* | 2/2008 | Zeira et al. | 370/345 |

FOREIGN PATENT DOCUMENTS

| CN | 1496159 A | 5/2004 |
| EP | 1351424 A2 | 10/2003 |

* cited by examiner

*Primary Examiner* — Michael Thier
*Assistant Examiner* — Awet Haile
(74) *Attorney, Agent, or Firm* — Greenberg Traurig, LLP

(57) ABSTRACT

A method and system for acquiring continuous packet connectivity technology support capability information. The method comprises the following steps: sending a radio link establishing request message or a radio link adding request message to a drift radio network controller when it is monitored that a UE needs to establish or add a radio link with a cell dominated by the drift radio network controller, by means of a serving radio network controller; adding a continuous packet connectivity technology support capability information of an adjacent cell into a radio link establishing response message or a radio link adding response message after the radio link establishing request message or the radio link adding request message is received, and returning the radio link establishing response message or the radio link adding response message to the serving radio network controller, by means of the drift radio network controller; acquiring the continuous packet connectivity technology support capability information of the adjacent cell from the radio link establishing response message or the radio link adding response message, after the radio link establishing response message or the radio link adding response message is received, by means of the serving radio network controller.

10 Claims, 5 Drawing Sheets

METHOD AND SYSTEM FOR ACQUIRING CONTINUOUS PACKET CONNECTIVITY TECHNOLOGY SUPPORT CAPABILITY INFORMATION

CROSS-REFERENCE TO RELATED APPLICATION

This application is a national stage filing under 35 U.S.C. 371 of International Application PCT/CN2007/002556, filed on Aug. 23, 2007. International Application Application PCT/CN2007/002556 was published as WO 2008/049308 on May 2, 2008. Priority is claimed from China Application 200610137726 filed Oct. 26, 2006. The entire teachings of the referenced Applications are incorporated herein by reference.

BACKGROUND

1. Field

The present disclosure relates to high speed packet access technology of wireless communication system, in particular to a method and system for acquiring continuous packet connectivity technology support capability information.

2. General Background

In the high speed packet access system, the user equipment (UE) is allowed to stay in dedication state for a relative long time, in order to avoid to be shifted to cell common state as no data is sent in a relative short time, and UE power resource and system load can be saved while the UE is in dedicated state. 3GPP R7 protocol introduces continuous packet connectivity technology, in which, when there is no uplink data of UE or control information on HS-DPCCH (Dedicated Physical Control Channel (uplink) for high speed downlink sharing channel), the transmitter will be powered off; when there is uplink data of UE or control information on HS-DPCCH, the transmitter will be powered on, thus the UE power resource and system load can be saved; at the same time, the base station (BS) will power off the transmission of F-DPCH (Fractional Dedicated Physical Channel) during the interval in which the receiver is power off to avoid resource wasting. Namely, continuous packet connectivity technology can be implemented only under the supports of both the BS and the UE.

Whether the UE can employ continuous packet connectivity technology shall be controlled by radio network controller (RNC), according to 3GPP protocol, the UE which support high speed packet technology is forced to support continuous packet connectivity technology, while no requirement is applied to the BS. Therefore, it is necessary for the RNC to determine whether employing continuous packet connectivity technology based on the support capability of the BS, so as to configure related parameters required by continuous packet connectivity technology. In prior art, according to the standard protocol, the serving RNC can not acquire the information on whether the BS of the drift RNC supports continuous packet connectivity technology or not, thus continuous packet connectivity technology can not be correctly implemented.

Therefore there is a need for a solution for the serving RNC to acquire the continuous packet connectivity technology support capability information (CPC Capability) of drift RNC BS.

SUMMARY

Based on above one or several problems, the present disclosure aims to provide an improved technical solution for acquiring continuous packet connectivity technology support capability information, which is used to make the serving RNC acquire continuous packet connectivity technology support capability information of the drift RNC BS, so as to guarantee continuous packet connectivity technology can be implemented correctly, thus ensure service quality for users and save system resource.

In order to realize the above object, according to one aspect of the present disclosure, provides a method for acquiring continuous packet connectivity technology support capability information, comprising:

Step 102, sending a radio link establishing request message or a radio link adding request message to a drift radio network controller when it is monitored that a UE needs to establish or add a radio link with a cell dominated by the drift radio network controller, by means of a serving radio network controller;

Step 104, adding a continuous packet connectivity technology support capability information of an adjacent cell into a radio link establishing response message or a radio link adding response message after the radio link establishing request message or the radio link adding request message is received, and returning the radio link establishing response message or the radio link adding response message to the serving radio network controller, by means of the drift radio network controller;

Step 106, acquiring the continuous packet connectivity technology support capability information of the adjacent cell from the radio link establishing response message or the radio link adding response message, after the radio link establishing response message or the radio link adding response message is received, by means of the serving radio network controller.

when it is monitored that the UE needs to establish the radio link with the cell dominated by the drift radio network controller, sending the radio link establishing request message to the drift radio network controller by means of the serving radio network controller, and adding the continuous packet connectivity technology support capability information of the adjacent cell into the radio link establishing response message by means of the drift radio network controller; when it is monitored that the UE needs to add the radio link with the cell dominated by the drift radio network controller, sending the radio link adding request message to the drift radio network controller by means of the serving radio network controller, and adding the continuous packet connectivity technology support capability information of the adjacent cell into the radio link adding response message by means of the drift radio network controller.

The continuous packet connectivity technology support capability information of the adjacent cell may indicates whether continuous packet connectivity technology is supported by certain bits.

The continuous packet connectivity technology support capability information of the adjacent cell acquired by the serving radio network controller in the Step 106, is used to determine whether the UE continue to employ, stop employing, or begin to employ continuous packet connectivity technology after the radio link is established or added. If continuous packet connectivity technology has been employed by the UE, the continuous packet connectivity technology support capability information of the adjacent cell indicates that continuous packet connectivity technology is supported, and the adjacent cell needs to be added into an active set, then determining that the UE continue to employ continuous packet connectivity technology by means of the serving radio network controller; if continuous packet connectivity technology has been employed by the UE, the continuous packet connectivity technology support capability information of the adjacent cell indicates that continuous packet connectivity technology is not supported, and the adjacent cell needs to be added into the active set, then determining that the UE stop employing continuous packet connectivity technology by means of the serving radio network controller; if continuous packet connectivity technology has not been employed by the UE, the continuous packet connectivity technology support capability information of the adjacent cell indicates that continuous packet connectivity technology is supported, and the UE needs to hard handoff to the adjacent cell, then determining that the UE begin to employ continuous packet connectivity technology by means of the serving radio network controller.

In order to realize the above object, according to another aspect of the present disclosure, provides a system for acquiring continuous packet connectivity technology support capability information. The system includes: a serving radio network controller, for sending a radio link establishing request message or a radio link adding request message to a drift radio network controller when it is monitored that a UE needs to establish or add a radio link with a cell dominated by the drift radio network controller, and acquiring continuous packet connectivity technology support capability information of an adjacent cell from a radio link establishing response message or a radio link adding response message returned by the drift wireless network controller after the message is received; and the drift radio network controller, for adding the continuous packet connectivity technology support capability information of the adjacent cell into the radio link establishing response message or the radio link adding response message after the radio link establishing message or the radio link adding request message is received, and returning the radio link establishing response message or the radio link adding response message to the serving radio network controller.

The serving radio network controller is used to send the radio link establishing request message to the drift radio network controller when it is monitored that the UE needs to establish the radio link with the cell dominated by drift radio network controller, and the drift radio network controller is used to add the continuous packet connectivity technology support capability information of the adjacent cell into the radio link establishing response message; the serving radio network controller is used to send the radio link adding request message to the drift radio network controller when it is monitored that the UE needs to add the radio link with the cell dominated by the drift radio network controller, and the drift radio network controller is used to add the continuous packet connectivity technology support capability information of the adjacent cell into the radio link adding response message.

The continuous packet connectivity technology support capability information of the adjacent cell may indicate whether continuous packet connectivity technology is supported by certain bits.

The serving radio network controller is used to determine that the UE continue to employ continuous packet connectivity technology, in the case of continuous packet connectivity technology has been employed by the UE, the continuous packet connectivity technology support capability information of the adjacent cell indicates that continuous packet connectivity technology is supported, and the adjacent cell needs to be added into an active set; the serving radio network controller is used to determine that the UE stop employing continuous packet connectivity technology, in the case of continuous packet connectivity technology has been employed by the UE, the continuous packet connectivity technology support capability information of the adjacent cell indicates that continuous packet connectivity technology is not supported, and the adjacent cell needs to be added into the active set; the serving radio network controller is used to determine that the UE begin to employ continuous packet connectivity technology, in the case of continuous packet connectivity technology has not been employed by the UE, the continuous packet connectivity technology support capability information of the adjacent cell indicates that continuous packet connectivity technology is supported, and the UE needs to hard handoff to the adjacent cell.

With at least of the above technical solution, the present disclosure allows that the serving RNC to acquire whether the cell dominated by the drift network controller supports continuous packet connectivity technology or not, so as to ensure that continuous packet connectivity technology can be correctly used, thus the serving quality can be guaranteed and the system resource can be saved.

DESCRIPTION OF THE DRAWINGS

The drawings illustrated here provide a further understanding to the present disclosure and form a part of the application, and the exemplary embodiments of the present disclosure and the description thereof are used to explain the present disclosure, rather than limit the present disclosure improperly, in which.

DETAILED DESCRIPTION

The embodiments of the present disclosure will be described hereinafter in detail with reference to the accompany drawings. If not conflict, the embodiments and the technical features of the embodiments can be combined with each other.

The method of the embodiment of the present disclosure is implemented based on the prior art 3GPP protocol standard, by adding the continuous packet connectivity technology support capability information of the BS into a radio link establishing response message or a radio link adding response message returned by the drift RNC. Concretely, the method can be implemented with but no limited to the following two ways: (1) the drift RNC carries the continuous packet connectivity technology support capability information of the adjacent cell on the radio link establishing response message; (2) the drift RNC carries the continuous packet connectivity technology support capability information of the adjacent cell on the radio link adding response message.

Embodiment 1

Figure 1:
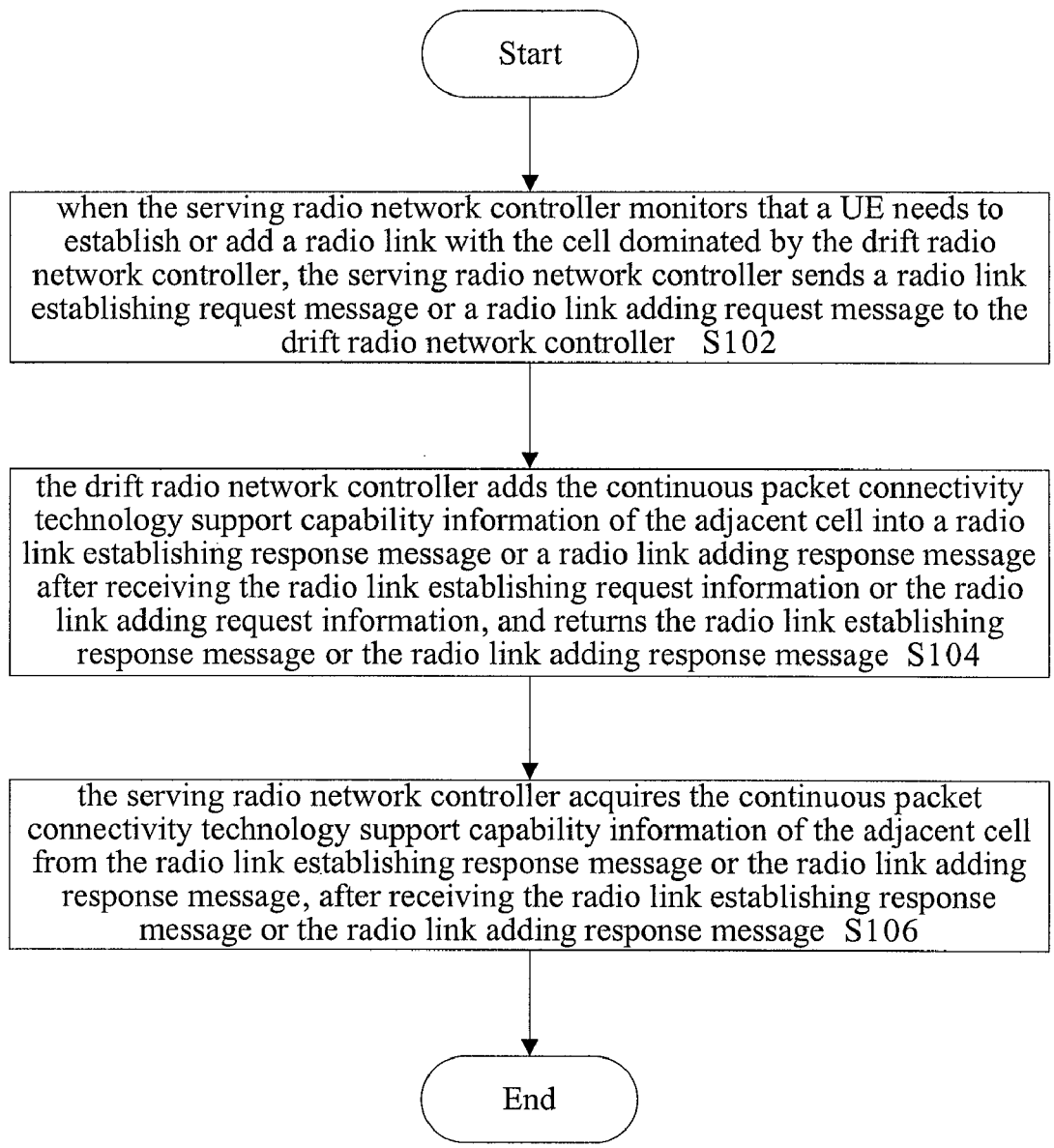
FIG. 1 is a flow chart of the method for acquiring continuous packet connectivity technology support capability (CPC Capability) information according to the embodiment of the present disclosure.

Referring to FIG. 1, the method for acquiring continuous packet connectivity technology support capability information according to the embodiment of the present disclosure comprises the following steps:

Step 102, sending a radio link establishing request message or a radio link adding request message to a drift radio network controller when it is monitored that a UE needs to establish or add a radio link with a cell dominated by the drift radio network controller, by means of a serving radio network controller;

Step 104, adding a continuous packet connectivity technology support capability information of an adjacent cell into a radio link establishing response message or a radio link adding response message after the radio link establishing request message or the radio link adding request message is received, and returning the radio link establishing response message or the radio link adding response message to the serving radio network controller, by means of the drift radio network controller;

Step 106, acquiring the continuous packet connectivity technology support capability information of the adjacent cell from the radio link establishing response message or the radio link adding response message, after the radio link establishing response message or the radio link adding response message is received, by means of the serving radio network controller.

Case 1 when it is monitored that the UE needs to establish the radio link with the cell dominated by the drift radio network controller, sending the radio link establishing request message to the drift radio network controller by means of the serving radio network controller, and adding the continuous packet connectivity technology support capability information of the adjacent cell into the radio link establishing response message by means of the drift radio network controller.

Figure 3A:
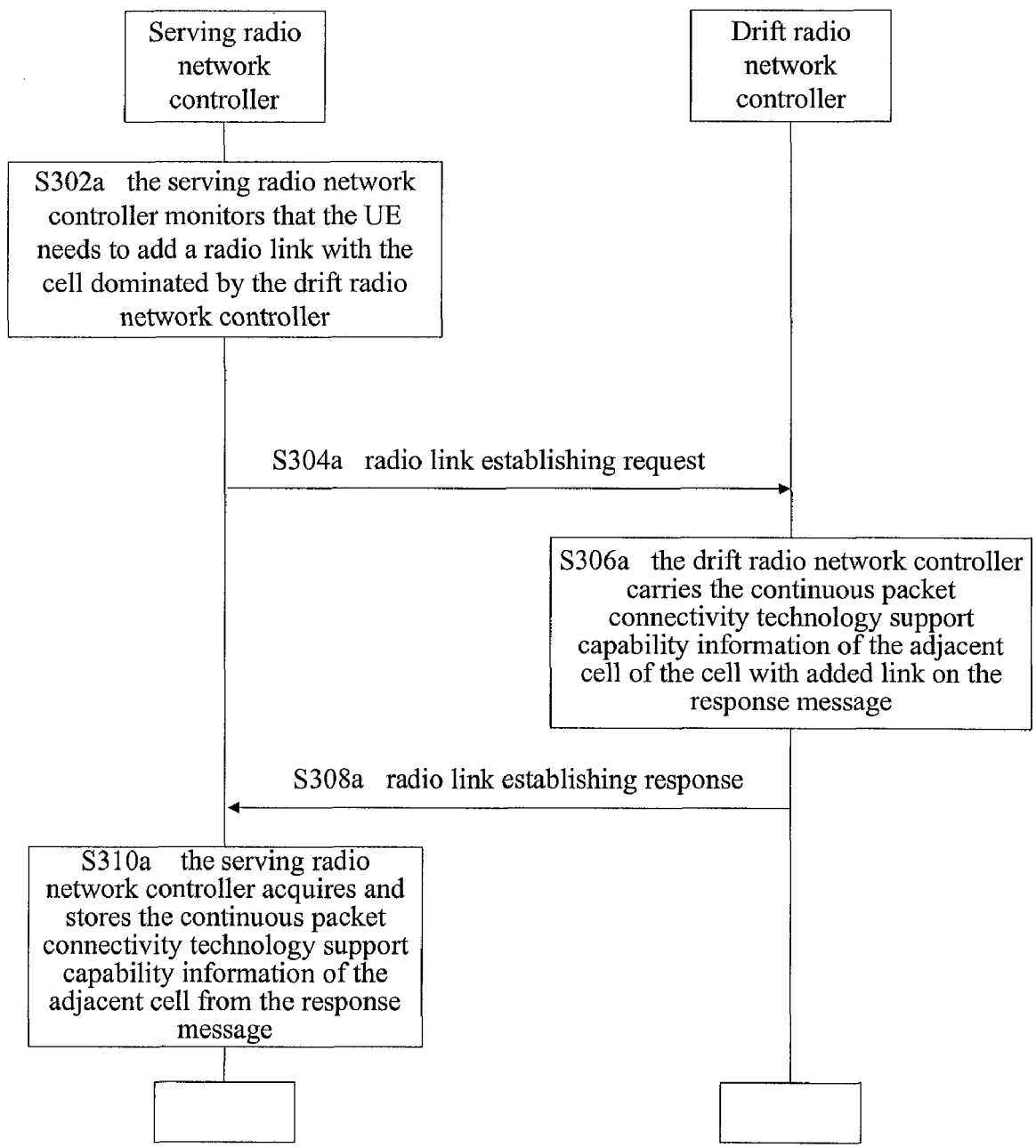
FIG. 3a is a flow chart of acquiring information according to the embodiment of the present disclosure.

The examples of the embodiments of the present disclosure are shown by the flow chart of FIG. 3a:

Step 302a, the serving RNC monitors that the UE needs to establish a radio link with the cell dominated by the drift RNC.

Step 304a, the serving RNC sends a radio link establishing request message to the drift RNC.

Step 306a, the drift RNC writes the continuous packet connectivity technology support capability information of the adjacent cell to the radio link establishing response message.

Step 308a, the drift RNC returns the radio link establishing response message to the serving RNC.

Step 310a, the serving RNC acquires and stores the continuous packet connectivity technology support capability information of the adjacent cell from the radio link establishing response message.

Case 2 when it is monitored that the UE needs to add the radio link with the cell dominated by the drift radio network controller, sending the radio link adding request message to the drift radio network controller by means of the serving radio network controller, and adding the continuous packet connectivity technology support capability information of the adjacent cell into the radio link adding response message by means of the drift radio network controller.

Figure 3B:
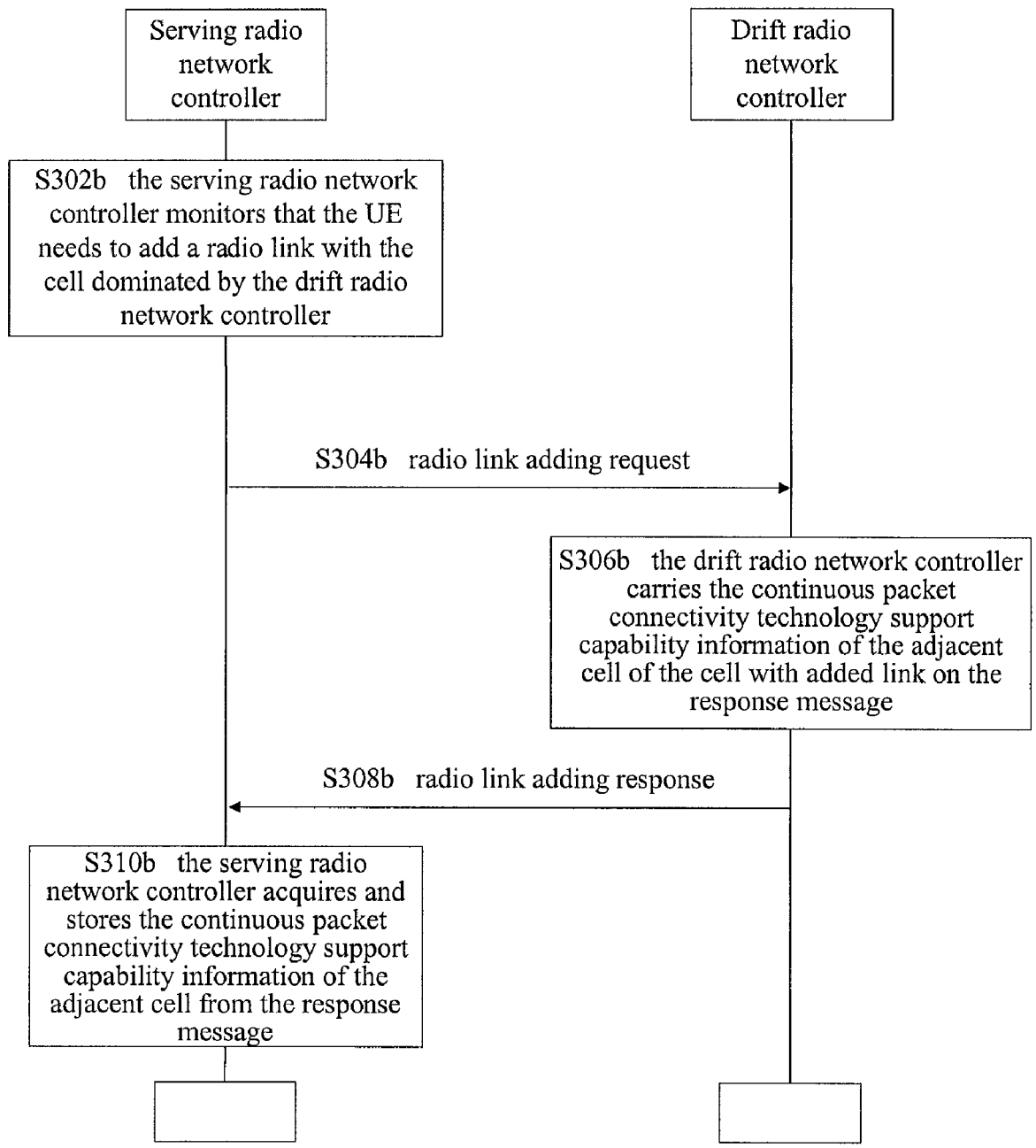
FIG. 3b is another flow chart of acquiring information according to the embodiment of the present disclosure.

The examples of the embodiments of the present disclosure are shown by the flow chart of FIG. 3b:

Step 302b, the serving RNC monitors that the UE needs to add a radio link with the cell dominated by the drift RNC.

Step 304b, the serving RNC sends a radio link adding request message to the drift RNC.

Step 306b, the drift RNC writes the continuous packet connectivity technology support capability information of the adjacent cell to the radio link adding response message.

Step 308b, the drift RNC returns the radio link adding response message to the serving RNC.

Step 310b, the serving RNC acquires and stores the continuous packet connectivity technology support capability information of the adjacent cell from the radio link adding response message.

Preferably, the continuous packet connectivity technology support capability information of the adjacent cell indicates whether continuous packet connectivity technology is supported or not by certain bits. For example, "0" denotes not being supported, "1" denotes being supported; the continuous packet connectivity technology support capability information of the adjacent cell can also be indicated by other ways.

The continuous packet connectivity technology support capability information of the adjacent cell acquired by the serving radio network controller in the Step 106, is used to determine whether the UE continue to employ, stop employing, or begin to employ continuous packet connectivity technology after the radio link is established or added, which will be described in detail in the following three cases.

Case 1

If continuous packet connectivity technology has been employed by the UE, the continuous packet connectivity technology support capability information of the adjacent cell indicates that continuous packet connectivity technology is supported, and the adjacent cell needs to be added into an active set, then determining that the UE continue to employ continuous packet connectivity technology by means of the serving radio network controller.

Case 2

If continuous packet connectivity technology has been employed by the UE, the continuous packet connectivity technology support capability information of the adjacent cell indicates that continuous packet connectivity technology is not supported, and the adjacent cell needs to be added into the active set, then determining that the UE stop employing continuous packet connectivity technology by means of the serving radio network controller.

Case 3

If continuous packet connectivity technology has not been employed by the UE, the continuous packet connectivity technology support capability information of the adjacent cell indicates that continuous packet connectivity technology is supported, and the UE needs to hard handoff to the adjacent cell, then determining that the UE begin to employ continuous packet connectivity technology by means of the serving radio network controller.

Embodiment 2

Figure 2:
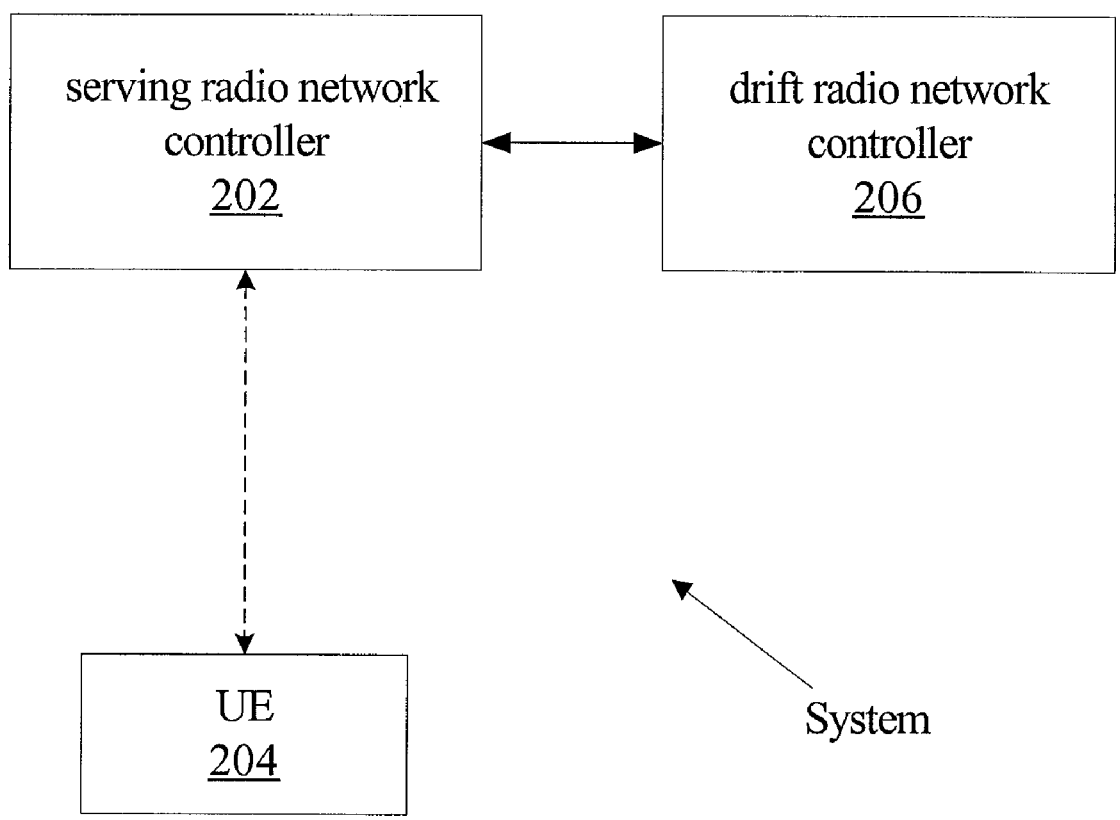
FIG. 2 is a block diagram of the system for acquiring continuous packet connectivity technology support capability information according to the embodiment of the present disclosure.

Referring to FIG. 2, the system for acquiring continuous packet connectivity technology support capability according to the embodiment of the present disclosure comprises a serving RNC 202 and a drift RNC 206. Preferably, the system can be used to implement the method described above.

Wherein, the serving RNC 202 is used to send a radio link establishing request message or a radio link adding request message to drift RNC 206 after monitoring that UE 204 needs to establish or add a radio link with a cell dominated by drift RNC 206, and acquires continuous packet connectivity technology support capability information of the adjacent cell from a radio link establishing response message or radio link adding response message after receiving the two messages returned by drift RNC 206; and drift RNC 206, which adds the continuous packet connectivity technology support capability information of the adjacent cell into the radio link establishing response message or radio link adding response message after receiving the radio link establishing request message or the radio link adding requesting message, and returns the radio link establishing response message or radio link adding response message to serving RNC 202.

When serving RNC 202 monitors that UE 204 needs to establish the radio link with the cell dominated by drift RNC 206, it sends the radio link establishing request message to drift RNC 206 which adds the continuous packet connectivity technology support capability information of the adjacent cell into the radio link establishing response message; when serving RNC 202 monitors that UE 204 needs to add the radio link with the cell dominated by drift RNC 206, it sends the radio link adding request message to drift RNC 206 which adds the continuous packet connectivity technology support capability information of the adjacent cell into the radio link adding response message.

The continuous packet connectivity technology support capability information of the adjacent cell can indicate whether continuous packet connectivity technology is supported by certain bits.

The serving RNC 202 is used to determine whether UE 204 continues to employ, stops employing, or begins to employ continuous packet connectivity technology through the acquired continuous packet connectivity technology support capability information of the adjacent cell after establishing or adding the radio link. When UE 204 has employed continuous packet connectivity technology, the continuous packet connectivity technology support capability information of the adjacent cell indicates continuous packet connectivity technology being supported, and the adjacent cell needs to be added into the active set, serving RNC 202 determines that UE 204 continues to employ continuous packet connectivity technology; When UE 204 has employed continuous packet connectivity technology, the continuous packet connectivity technology support capability information of the adjacent cell indicates continuous packet connectivity technology not being supported, and the adjacent cell needs to be added into the active set, serving RNC 202 determines that the UE 204 stops employing continuous packet connectivity technology; When UE 204 has not employed continuous packet connectivity technology, the continuous packet connectivity technology support capability information of the adjacent cell indicates continuous packet connectivity technology being supported, and UE 204 needs to hard handoff to the adjacent cell, serving RNC 202 determines that UE 204 begins to employ continuous packet connectivity technology.

The embodiment of the present disclosure also relates to a method for drift RNC of high speed packet access system of mobile communication system reporting cell capability.

The scheme of the embodiment of the present disclosure comprises the following steps:

Step 1: the serving RNC monitors that the UE needs to establish or add a radio link with the cell dominated by the drift RNC.

Step 2: the serving RNC sends a radio link establishing request message or a radio link adding request message to the drift RNC.

Step 3: the drift RNC writes the continuous packet connectivity technology support capability information of the adjacent cell to the radio link establishing response or the radio link adding response message.

Step 4: the drift RNC returns the radio link establishing response message or the radio link adding response message to the serving RNC.

Step 5: the serving RNC acquires and stores the continuous packet connectivity technology support capability information of the adjacent cell from the radio link establishing response or the radio link adding response message, which is a basis for the serving network controller determining the UE to continue to employ, stop employing or begin to employ continuous packet connectivity technology after the user adding a radio link.

From the above description, it can be seen that the method for the serving RNC acquiring the continuous packet connectivity technology support capability information of the drift RNC BS, is implemented by carrying the continuous packet connectivity technology support capability information of the adjacent cell in the radio link establishing response message or the radio link adding response message by the drift RNC.

Wherein, in Step 5, the serving RNC acquiring continuous packet connectivity technology support capability information of the adjacent cell from the radio link establishing response message or the radio link adding response message as the basis for the serving network controller determining the UE to continue to employ, stop employing or begin to employ continuous packet connectivity technology after the user adding a radio link, which means that the UE has employed the continuous packet connectivity technology, however, if the RNC find that the cell with new added link supports continuous packet connectivity technology based on the above response message, the UE can continue to employ continuous packet connectivity technology; or else the UE will stop employing continuous packet connectivity technology.

Figure 4:
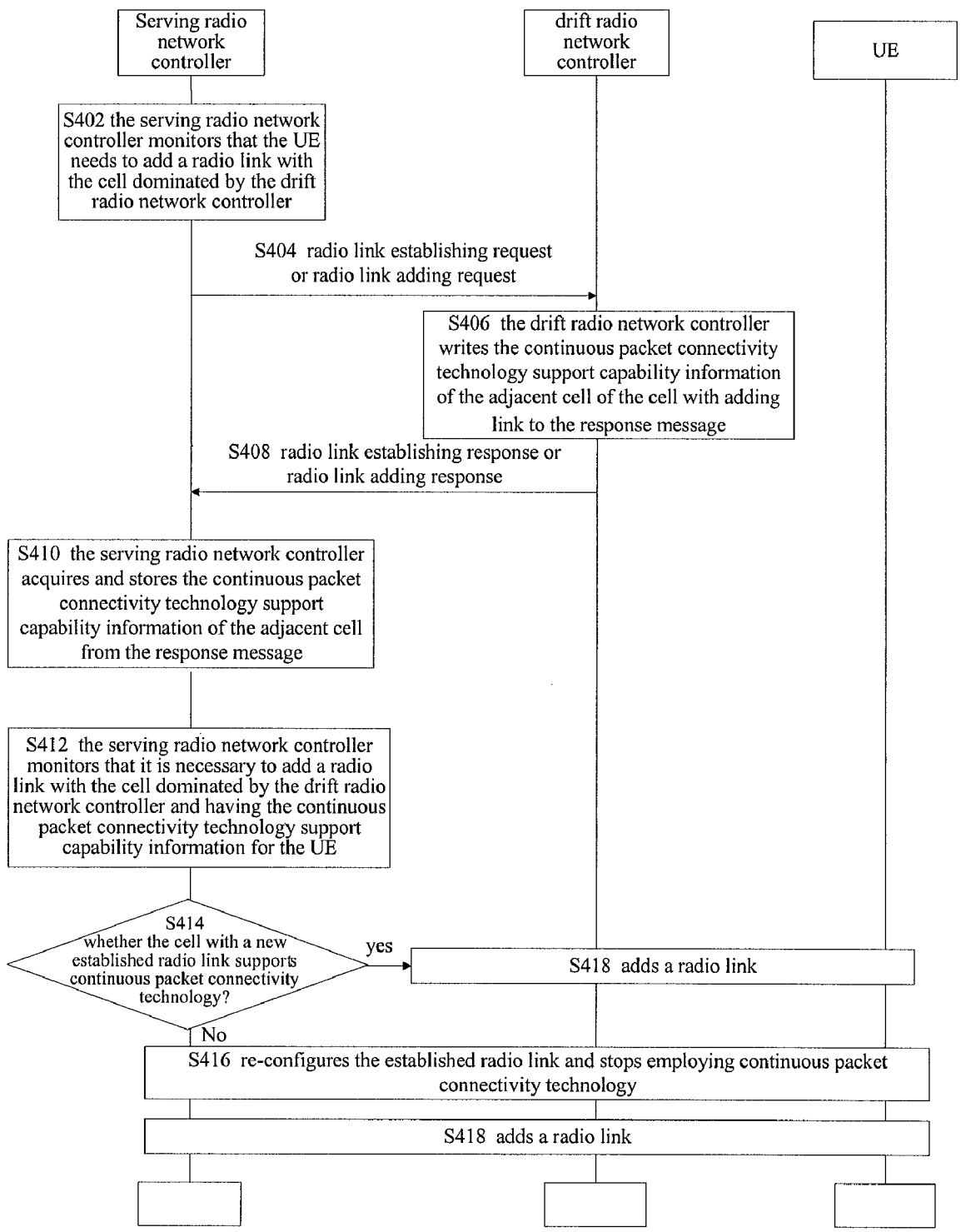
FIG. 4 is a flow chart of acquiring and applying information according to the embodiment of the present disclosure.

A further detailed description of the embodiment of the present disclosure will be given in connection with the drawings. Another embodiment of the present disclosure provides a method for the serving RNC configuring continuous packet connectivity technology for the UE and the BS according to the continuous packet connectivity technology support capability information reported by the drift RNC, as shown in FIG. 4:

Step 402, the serving RNC monitors that the UE needs to establish or add a radio link with the cell dominated by the drift RNC.

Step 404, the serving RNC sends a radio link establishing request message or a radio link adding request message to the drift RNC.

Step 406, the drift RNC writes the continuous packet connectivity technology support capability information of the adjacent cell to a radio link establishing response message or a radio link adding response message.

Step 408, the drift RNC returns the radio link establishing response message or the radio link adding response message to the serving RNC.

Step 410, the serving RNC acquires and stores the continuous packet connectivity technology support capability information of the adjacent cell from the radio link establishing response message or the radio link adding response message.

Step 412, the serving RNC monitors that it is necessary to add a radio link of a cell dominated by the drift RNC and having the continuous packet connectivity technology support capability information in the saved message for the UE.

Step 414, the serving RNC judges whether the cell with a new established radio link supports continuous packet connectivity technology, if does, the Step 418 will be performed, or else the Step 416 will be performed.

Step 416, the serving RNC re-configures the established radio link for the UE and stops employing continuous packet connectivity technology.

Step 418, the serving RNC establishes the radio link between the UE and the cell dominated by the drift RNC.

The preferred embodiment of the present disclosure is described for the purpose of illustration, not for limiting the present disclosure. For those skilled in the art, it is obvious that various alterations and modifications can be made to the present disclosure. Any alterations, substitutions and modifications falling into the spirit and principle of the present disclosure will fall within the scope of the present disclosure.

The invention claimed is:

1. A method for acquiring continuous packet connectivity technology support capability information, comprising the steps of:
sending, by means of a serving radio network controller, a radio link establishing request message or a radio link adding request message to a drift radio network controller when the serving radio network controller monitors that a UE needs to establish or add a radio link with a cell dominated by the drift radio network controller;
adding the continuous packet connectivity technology support capability information of an adjacent cell into a radio link establishing response message or a radio link adding response message after the radio link establishing request message or the radio link adding request message is received, and returning the radio link establishing response message or the radio link adding response message to the serving radio network controller, by means of the drift radio network controller, wherein the adjacent cell is adjacent to the cell dominated by the drift radio network controller; and
acquiring the continuous packet connectivity technology support capability information of the adjacent cell from the radio link establishing response message or the radio link adding response message, after the radio link establishing response message or the radio link adding response message is received, by means of the serving radio network controller.

2. The method according to claim 1, wherein:
when it is monitored that the UE needs to establish the radio link with the cell dominated by the drift radio network controller, sending the radio link establishing request message to the drift radio network controller by means of the serving radio network controller, and adding the continuous packet connectivity technology support capability information of the adjacent cell into the radio link establishing response message by means of the drift radio network controller; and
when it is monitored that the UE needs to add the radio link with the cell dominated by the drift radio network controller, sending the radio link adding request message to the drift radio network controller by means of the serving radio network controller, and adding the continuous packet connectivity technology support capability information of the adjacent cell into the radio link adding response message by means of the drift radio network controller.

3. The method according to claim 1, wherein:
the continuous packet connectivity technology support capability information of the adjacent cell indicates whether continuous packet connectivity technology is supported by certain bits.

4. The method according to any one of claims 1 to 3, wherein: the continuous packet connectivity technology support capability information of the adjacent cell acquired by the serving radio network controller in the step of acquiring the continuous packet connectivity technology support capability information is used to determine whether the UE continue to employ, stop employing, or begin to employ the continuous packet connectivity technology after the radio link is established or added.

5. The method according to claim 4, wherein: if the continuous packet connectivity technology has been employed by the UE, the continuous packet connectivity technology support capability information of the adjacent ceil indicates that the continuous packet connectivity technology is supported, and the adjacent cell needs to be added into an active set, then determining that the UE continue to employ the continuous packet connectivity technology by means of the serving radio network controller;
if the continuous packet connectivity technology has been employed by the UE, the continuous packet connectivity technology support capability information of the adjacent cell indicates that the continuous packet connectivity technology is not supported, and the adjacent cell needs to be added into the active set, then determining that the UE stop employing the continuous packet connectivity technology by means of the serving radio network controller; and
if the continuous packet connectivity technology has not been employed by the UE, the continuous packet connectivity technology support capability information of the adjacent cell indicates that the continuous packet connectivity technology is supported, and the UE needs to hard handoff to the adjacent cell, then determining that the UE begin to employ the continuous packet connectivity technology by means of the serving radio network controller.

6. A system for acquiring continuous packet connectivity technology support capability information, comprised of:
a serving radio network controller, for sending a radio link establishing request message or a radio link adding request message to a drift radio network controller when it is monitored that a UE needs to establish or add a radio link with a cell dominated by the drift radio network controller, and acquiring the continuous packet connectivity technology support capability information of an adjacent cell from a radio link establishing response message or a radio link adding response message returned by the drift wireless network controller after the radio link establishing response message or the radio link adding response message is received; and
the drift radio network controller, for adding the continuous packet connectivity technology support capability information of the adjacent cell into the radio link establishing response message or the radio link adding response message after the radio link establishing message or the radio link adding request message is received, and returning the radio link establishing response message or the radio link adding response message to the serving radio network controller.

7. The system according to claim 6, wherein:
the serving radio network controller is used to send the radio link establishing request message to the drift radio network controller when it is monitored that the UE needs to establish the radio link with the cell dominated by drift radio network controller, and the drift radio network controller is used to add the continuous packet connectivity technology support capability information of the adjacent cell into the radio link establishing response message; and
the serving radio network controller is used to send the radio link adding request message to the drift radio network controller when it is monitored that the UE needs to add the radio link with the cell dominated by the drift radio network controller, and the drift radio network controller is used to add the continuous packet connectivity technology support capability information of the adjacent cell into the radio link adding response message.

8. The system according to claim 6, wherein: the continuous packet connectivity technology support capability information of the adjacent cell indicates whether the continuous packet connectivity technology is supported by certain bits.

9. The system according to any one of claims 6 to 8, wherein: the serving radio network controller is used to determine whether the UE continues to employ, stop employing, or begin to employ the continuous packet connectivity technology after the radio link is established or added, according to the continuous packet connectivity technology support capability information of the adjacent cell been acquired.

10. The system according to claim 9, wherein: the serving radio network controller is used to determine that the UE continue to employ continuous packet connectivity technology, in the case of the continuous packet connectivity technology has been employed by the UE, the continuous packet connectivity technology support capability information of the adjacent cell indicates that the continuous packet connectivity technology is supported, and the adjacent cell needs to be added into an active set;

the serving radio network controller is used to determine that the UE stop employing continuous packet connectivity technology, in the case of the continuous packet connectivity technology has been employed by the UE, the continuous packet connectivity technology support capability information of the adjacent cell indicates that the continuous packet connectivity technology is not supported, and the adjacent cell needs to be added into the active set; and the serving radio network controller is used to determine that the UE begin to employ continuous packet connectivity technology, in the case of the continuous packet connectivity technology has not been employed by the UE, the continuous packet connectivity technology support capability information of the adjacent cell indicates that the continuous packet connectivity technology is supported, and the UE needs to hard handoff to the adjacent cell.

* * * * *